US012605821B2

(12) United States Patent
Liao

(10) Patent No.: US 12,605,821 B2
(45) Date of Patent: Apr. 21, 2026

(54) TOOL TRAY

(71) Applicant: LIH YANN INDUSTRIAL CO., LTD., Taichung City (TW)

(72) Inventor: Po-Lin Liao, Taichung City (TW)

(73) Assignee: LIH YANN INDUSTRIAL CO., LTD., Taichung City (TW)

( * ) Notice: Subject to any disclaimer, the term of this patent is extended or adjusted under 35 U.S.C. 154(b) by 0 days.

(21) Appl. No.: 18/915,681

(22) Filed: Oct. 15, 2024

(65) Prior Publication Data

US 2026/0102902 A1 Apr. 16, 2026

(51) Int. Cl.
*B25H 3/06* (2006.01)

(52) U.S. Cl.
CPC .................................... *B25H 3/06* (2013.01)

(58) Field of Classification Search
CPC ................................ B25H 3/06; B65D 85/20
USPC ................ 206/350, 372, 373, 525, 526, 818
See application file for complete search history.

(56) References Cited

U.S. PATENT DOCUMENTS

| | | | | | |
|---|---|---|---|---|---|
| 2,737,956 | A * | 3/1956 | Casper | A24F 19/14 206/818 |
| 5,080,230 | A * | 1/1992 | Winnard | B25H 3/06 206/818 |
| 5,405,004 | A * | 4/1995 | Vest | B25H 3/06 206/372 |
| 5,743,394 | A * | 4/1998 | Martin | B25H 3/003 206/350 |
| 2005/0258059 | A1* | 11/2005 | Joyce | B29C 39/10 206/350 |

FOREIGN PATENT DOCUMENTS

| | | | | |
|---|---|---|---|---|
| TW | M377308 U | * | 4/2010 | B25H 3/06 |

* cited by examiner

*Primary Examiner* — Bryon P Gehman
(74) *Attorney, Agent, or Firm* — Muncy, Geissler, Olds & Lowe, P.C.

(57) ABSTRACT

A tool tray is provided, wherein the tool tray includes: a tray body including a plurality of storage portions and at least one flexible portion, the at least one flexible portion being connected between two of the plurality of storage portions; and at least one first magnetic member disposed on at least one of the plurality of storage portions.

8 Claims, 4 Drawing Sheets

TOOL TRAY

BACKGROUND OF THE INVENTION

Field of the Invention

The present invention relates to a storage device, particularly to a tool tray.

Description of the Prior Art

When assembling or servicing a machine device, many tools and various connecting components are often used, such as screwdrivers, screwdriver bits, screws, nuts, springs, bolts, and/or the like. To avoid losing these components, people usually place a container nearby to store these components. The container may be, but is not limited to, cups, boxes, trays or the like.

However, the containers mentioned above for storing components are often obtained for temporary use and are not specifically designed for storing components. Therefore, there are many inconveniences in use, such as easy tipping or components falling out, etc.

The present invention is, therefore, arisen to obviate or at least mitigate the above-mentioned disadvantages.

SUMMARY OF THE INVENTION

The main object of the present invention is to provide a tool tray which can bend and deform to conform to different working environments, allowing users to stably place tools in different environments, thereby improving work efficiency and smoothness.

To achieve the above and other objects, a tool tray is provided, wherein the tool tray includes: a tray body including a plurality of storage portions and at least one flexible portion, the at least one flexible portion being connected between two of the plurality of storage portions; and at least one first magnetic member disposed on at least one of the plurality of storage portions.

The present invention will become more obvious from the following description when taken in connection with the accompanying drawings, which show, for purpose of illustrations only, the preferred embodiment (s in accordance with the present invention.

DETAILED DESCRIPTION OF THE PREFERRED EMBODIMENTS

Figure 1:
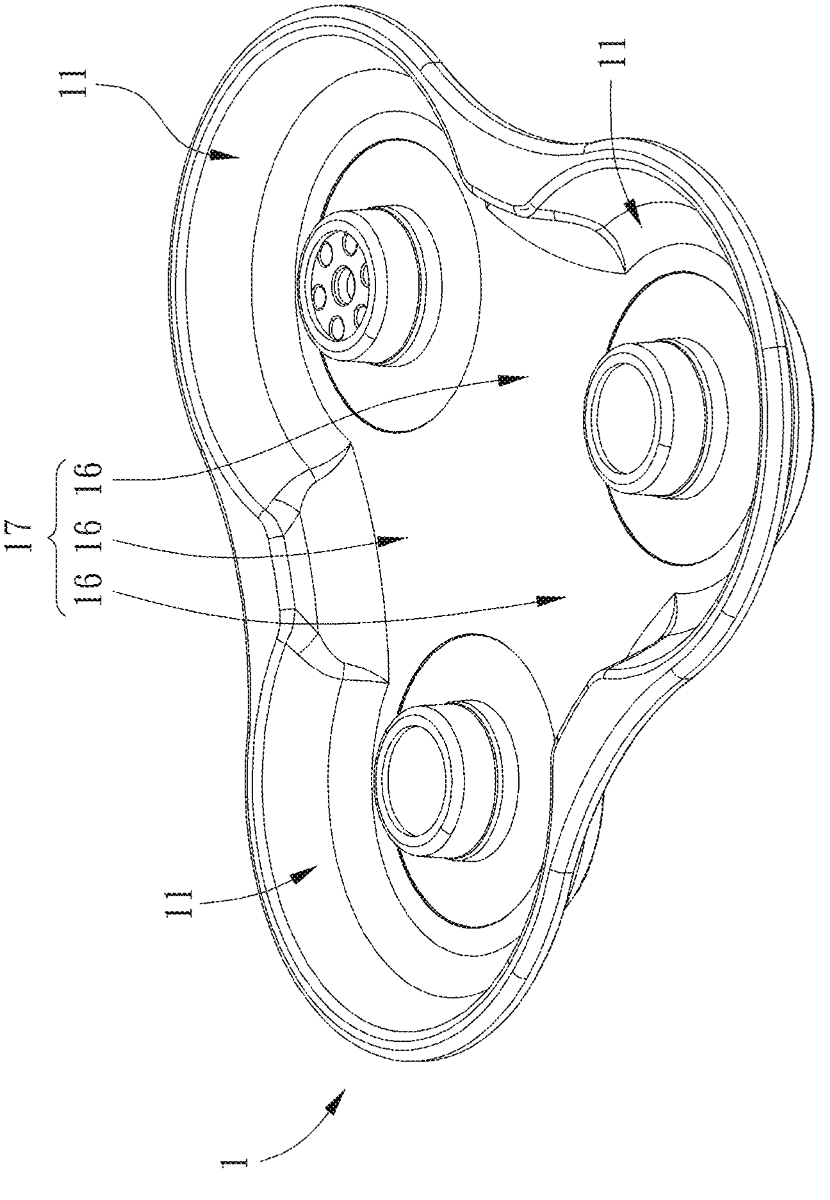
FIG. 1 is a perspective view of an exemplary embodiment of the present invention.
Figure 2:
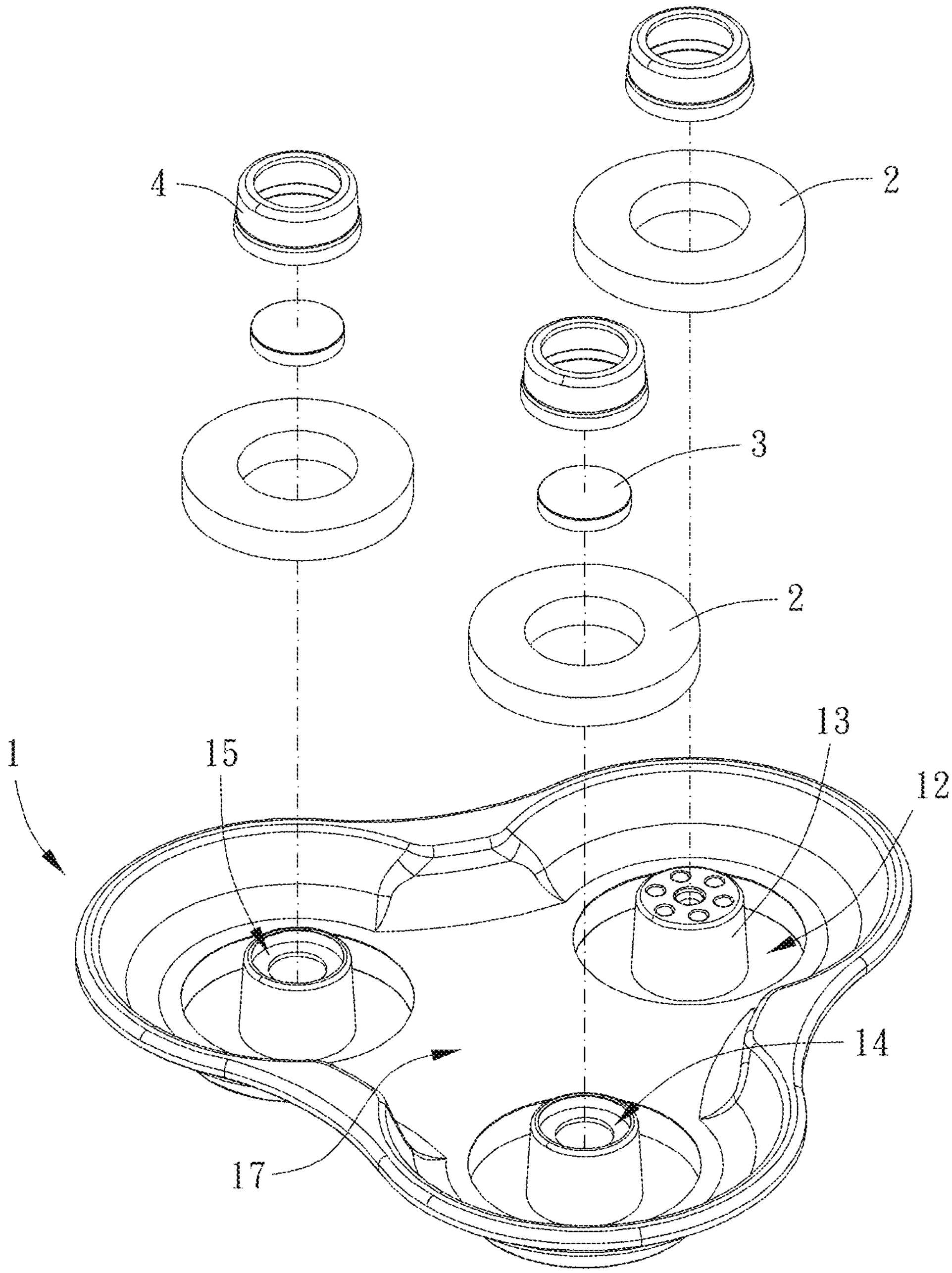
FIG. 2 is an exploded view of FIG. 1.
Figure 3:
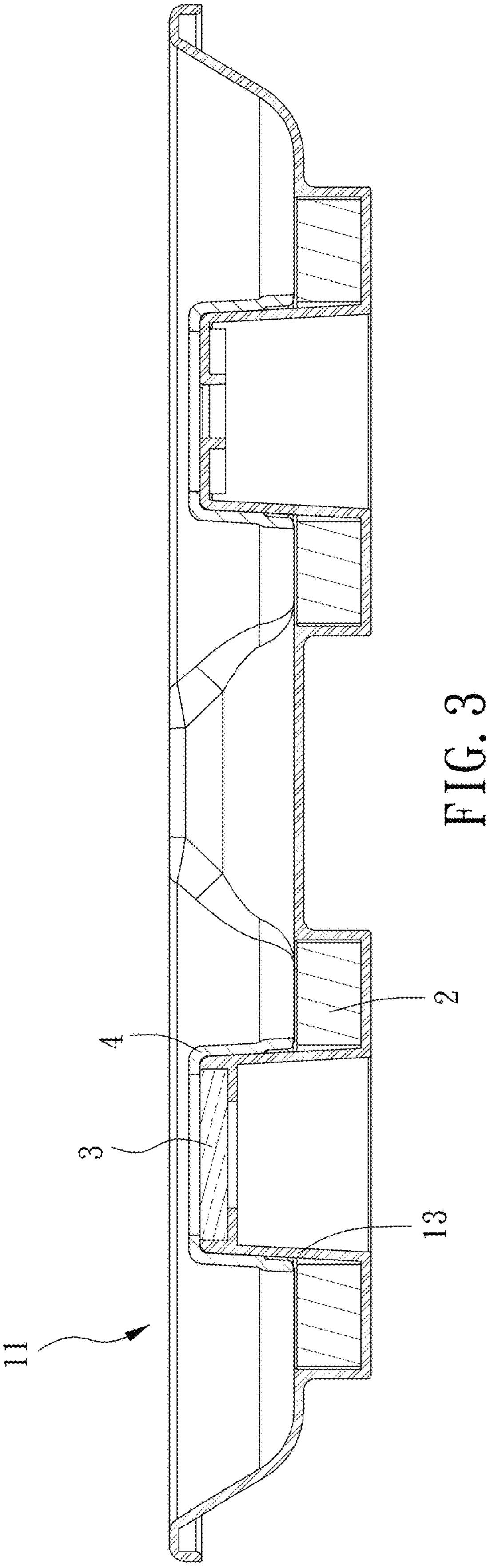
FIG. 3 is a cross-sectional view of FIG. 1.
Figure 4:
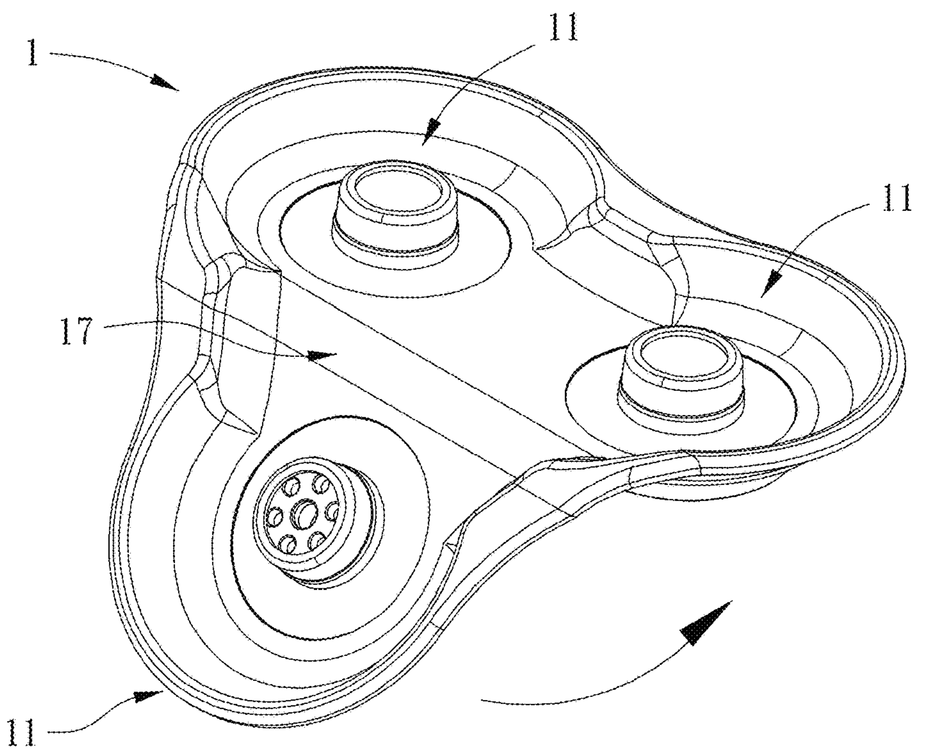
FIGS. 4 and 5 are drawings showing a flexible portion which is bent according to an exemplary embodiment of the present invention.
Figure 5:
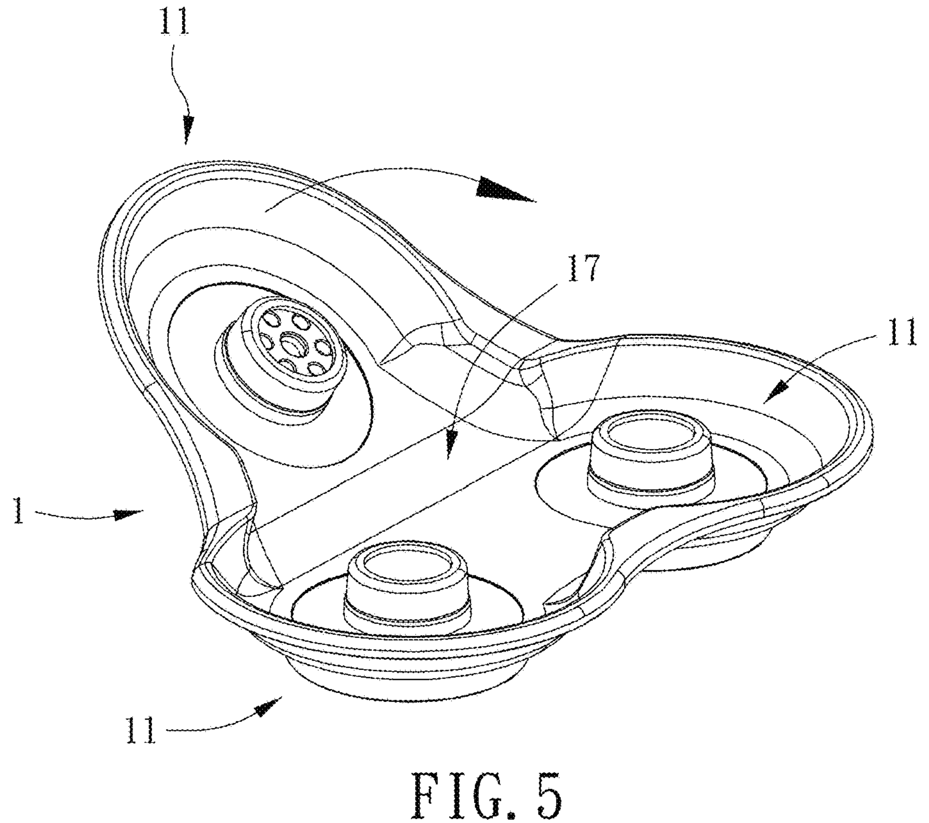

Please refer to FIGS. 1 to 5 for an exemplary embodiment of the present invention. A tool tray of the present invention includes a tray body 1 and at least one first magnetic member 2.

The tray body 1 includes a plurality of storage portions 11 and at least one flexible portion 16, where the at least one flexible portion 16 is connected between two of the storage portions 11. By bending the at least one flexible portion 16, the relative position and angle between the two storage portions 11 can be freely changed to adapt to the working environment. For example, but not limited to, the at least one flexible portion 16 can be bent into an angle, allowing the two storage portions 11 to simultaneously provide positions for the user to place components on different surfaces of the angle.

The at least one first magnetic member 2 is disposed on at least one of the storage portions 11. The at least one first magnetic member 2 can magnetically attract magnetically-attractive tools or components such as screwdrivers, screws, nuts, springs, or bolts. Additionally, the tray body 1 can be securely attached to a magnetically-attractive object such as a car body or metal casing near the user's workspace using the at least one first magnetic member 2.

Preferably, the at least one flexible portion 16 is made of an elastic material so that it can return to its initial state when the external force is removed.

In another exemplary embodiment, the tray body 1 is integrally formed of one piece, offering advantages such as quick production, fewer components, simplified assembly steps, and continuous structure.

In yet another exemplary embodiment, the tray body 1 is made of a soft material such as silicone, plastic, or rubber, allowing the tray body 1 to be capable of conforming to the surface of an object. Moreover, the soft tray body 1 ensures that the surface of the object in contact with it remains intact, preventing damage or scratches caused by friction or impact.

In this embodiment, the at least one flexible portion includes a plurality of flexible portions 16. The plurality of flexible portions 16 are interconnected to form a deformable region 17, and the plurality of storage portions 11 are located outside the deformable region 17. By twisting or bending the deformable region 17, the relative positions of the plurality of storage portions 11 can be freely adjusted. The plurality of storage portions 11 are arranged at equal angular intervals around the center of the deformable region 17.

Specifically, at least one of the plurality of storage portions 11 includes an annular groove 12 and a column 13. The annular groove 12 is disposed around the column 13 and receives the first magnetic member 2. Components attracted by the first magnetic member 2 can be laterally supported against the column 13 to enhance stability. In this embodiment, each of the plurality of storage portions 11 includes the annular groove 12 and the column 13, and the at least one first magnetic member includes a plurality of first magnetic members 2.

Specifically, the column 13 defines an internal space 14, and the internal space 14 receives a second magnetic member 3. The second magnetic member 3 can provide additional magnetic attraction in different positions and angles.

Preferably, the tool tray further includes at least one sleeve 4 which is sleeved on the column 13 and blocks the first magnetic member 2 in the direction in which the annular groove 12 is opened. The sleeve 4 ensures the structural integrity of the column 13 and prevents the first magnetic member 2 from falling out. The sleeve 4 has a thickness equal to a thickness of the tray body 1.

In another exemplary embodiment, the hardness of the sleeve 4 is greater than the hardness of the column 13, making it more wear-resistant and capable of effectively withstanding the impact or friction of components.

In this embodiment, the at least one sleeve includes a plurality of sleeves 4, and the number of the plurality of sleeves 4 is equal to the number of the plurality of first magnetic members 2. The column 13 further includes an opening 15 in communication with the internal space 14.

When the at least one sleeve 4 is sleeved on the column 13, a portion of the sleeve 4 at least partially covers the opening 15 to block the second magnetic member 3.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool tray including:

a tray body including a plurality of storage portions and at least one flexible portion, the at least one flexible portion being connected between two of the plurality of storage portions; and at least one first magnetic member disposed on at least one of the plurality of storage portions;

wherein at least one of the plurality of storage portions includes an annular groove and a column, the annular groove is disposed around the column, and the annular groove receives the at least one first magnetic member;

wherein the column defines an internal space, and the internal space receives a second magnetic member.

2. The tool tray of claim 1, wherein the at least one flexible portion is made of an elastic material.

3. The tool tray of claim 1, wherein the tray body is integrally formed of one piece.

4. The tool tray of claim 1, further including at least one sleeve, wherein the at least one sleeve is sleeved on the column and blocks the at least one first magnetic member in a direction in which the annular groove is opened.

5. The tool tray of claim 4, wherein the hardness of the at least one sleeve is greater than the hardness of the column.

6. The tool tray of claim 5, wherein the at least one flexible portion is made of an elastic material; the tray body is integrally formed of one piece; the at least one flexible portion includes a plurality of flexible portions, the plurality of flexible portions are interconnected to form a deformable region, and the plurality of storage portions are located outside the deformable region; the plurality of storage portions are arranged at equal angular intervals around a center of the deformable region; each of the plurality of storage portions includes the annular groove and the column; the tray body is made of a soft material including at least one of silicone, plastic and rubber; the at least one sleeve has a thickness equal to a thickness of the tray body; the at least one first magnetic member includes a plurality of first magnetic members; the at least one sleeve includes a plurality of sleeves, and the number of the plurality of sleeves is equal to the number of the plurality of first magnetic members; the column further includes an opening in communication with the internal space, and when the at least one sleeve is sleeved on the column, a portion of the at least one sleeve at least partially covers the opening and blocks the second magnetic member.

7. A tool tray including:

a tray body including a plurality of storage portions and at least one flexible portion, the at least one flexible portion being connected between two of the plurality of storage portions; and at least one first magnetic member disposed on at least one of the plurality of storage portions;

wherein the at least one flexible portion includes a plurality of flexible portions, the plurality of flexible portions are interconnected to form a deformable region, and the plurality of storage portions are located outside the deformable region.

8. The tool tray of claim 7, wherein the plurality of storage portions are arranged at equal angular intervals around a center of the deformable region.

* * * * *